United States Patent [19]
Suminski et al.

[11] Patent Number: 5,252,012
[45] Date of Patent: Oct. 12, 1993

[54] POSITIVE LOCK BROACH PULLER

[75] Inventors: Joseph E. Suminski, Romeo; James R. Uber, Pleasant Ridge, both of Mich.

[73] Assignee: The Cross Company, Fraser, Mich.

[21] Appl. No.: 940,359

[22] Filed: Sep. 3, 1992

[51] Int. Cl.⁵ .............................................. B23D 41/04
[52] U.S. Cl. ...................................... 409/244; 409/287
[58] Field of Search .................. 409/244, 287; 279/28, 279/74, 137

[56]           References Cited
           U.S. PATENT DOCUMENTS 3,199,409  8/1965  Bryant et al. ........................ 409/287
4,180,360  12/1979  Dopp ...................................... 409/287
4,859,125  8/1989  Lubiarz ................................ 409/287

Primary Examiner—Daniel W. Howell
Attorney, Agent, or Firm—John R. Benefiel

[57]                  ABSTRACT

A clamping jaw arrangement for a broach puller assembly is described in which first and second jaw sets are engaged with the end face and one side of the annular groove of the broach tool. The second jaw set initially engages one side of the annular groove and is locked in position with an associated spring urged operating sleeve, and upon lifting of the broach tool in reaction to engagement with the workpiece, the first jaw set moves radially inward and is held against the chamfered end face of the tool to eliminate all axial play while ensuring proper seating of the jaw elements in each set.

10 Claims, 3 Drawing Sheets

POSITIVE LOCK BROACH PULLER

BACKGROUND OF THE INVENTION

This invention concerns broach pullers having clamping jaws used to grip a grooved end of a broaching tool in a broaching machine. Broaching machines function by pulling an elongated toothed broaching tool through or past a workpiece to form a particular feature on the workpiece with the broaching tool teeth.

A recurrent problem when broaching internal holes has involved the engagement of the clamping jaws with the annular groove on the end of the tool, which arises because a clearance is required to insure proper seating of the jaws. This clearance creates an axial end play, but the pulling action forces one side of the groove tightly against the jaws until the end of the stroke. A slight tool drop occurs at the end of the stroke which usually is not significant but in some circumstances creates problems, such as when broaching helical gear teeth in the workpiece when the slight drop will damage the part. The slight lost motion also creates inaccuracies as the proper relative rotative and axial position is lost.

One solution is to actuate the upper handler slide to place the tool in tension at all times, but this adds to the cost and complexity of the machine, as additional controls and programming are required. In two station machines additional cylinders are required for the handling slide, and also, when helical broaching, a lead bar is required.

Another approach is described in U.S. Pat. No. 4,180,360 issued on Dec. 25, 1979, for a "BROACHING PULLING MECHANISM" in which an axially aligned piston is provided in the puller, pressurized to be forced against the end of the tool to eliminate the axial clearance. This approach also obviously adds cost and complexity.

Yet another approach is shown in U.S. Pat. No. 4,859,125 issued on Aug. 22, 1989 for a "HELICAL BROACH PULLER" in which a pair of jaw sets engage either side of the annular groove to purportedly eliminates the end play. It is uncertain whether proper seating of both jaw sets can be reliably achieved by that design.

The object of the present invention is to provide a clamping jaw arrangement for a broach puller which eliminate axial end play by simple yet reliable means.

SUMMARY OF THE INVENTION

This and other objects are achieved by first and second clamping jaws separately and successively spring operated by individual operating sleeves. The first jaw set is normally partially positioned radially inward sufficiently to be engaged by the end face of the broaching tool as it is lowered into the puller. A first operating sleeve is spring urged to move axially to force the first jaw set further in radially, but is held by a second operating sleeve associated with a second jaw set, which in turn is held by engagement with fixed machine structure with the puller assembly in the raised position.

The second jaw set is completely freed in this position to allow entry of the end of the broach tool and alignment of the jaw set with the side of the annular groove in the broach tool adjacent the end face.

Upon downward movement of the puller assembly, the second operating sleeve is spring advanced to force the second jaw set radially into the annular groove adjacent the one side but with an axial clearance therebetween.

The first jaw set remains in engagement with the tool end face, held there until tool reaction forces lift the broaching tool, forcing the one side of the annular groove against the jaws of the second jaw set.

The first jaw set is then released to be forced completely radially inwardly until fully seated against the chamfered end face to eliminate all axial clearance between the puller assembly and the tool.

DESCRIPTION OF THE DRAWING VIEWS

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations with the scope of the appended claims.

Figure 1:
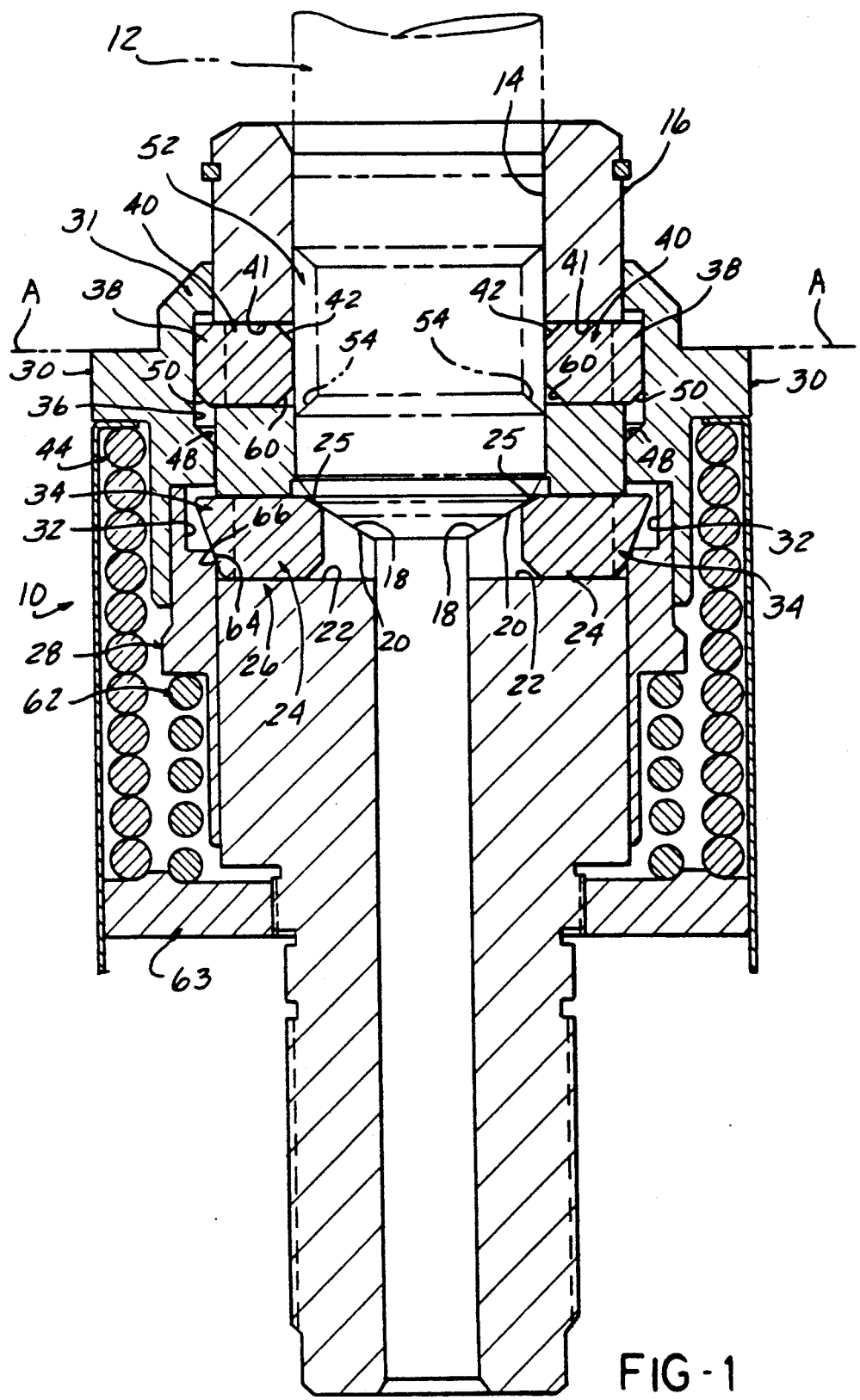
FIG. 1 is a view of an opened puller assembly according to the present invention in longitudinal section with the end of a broach tool shown in section, but with the jaws of the first jaw set shown rotated out of position for clarity.
Figure 4:
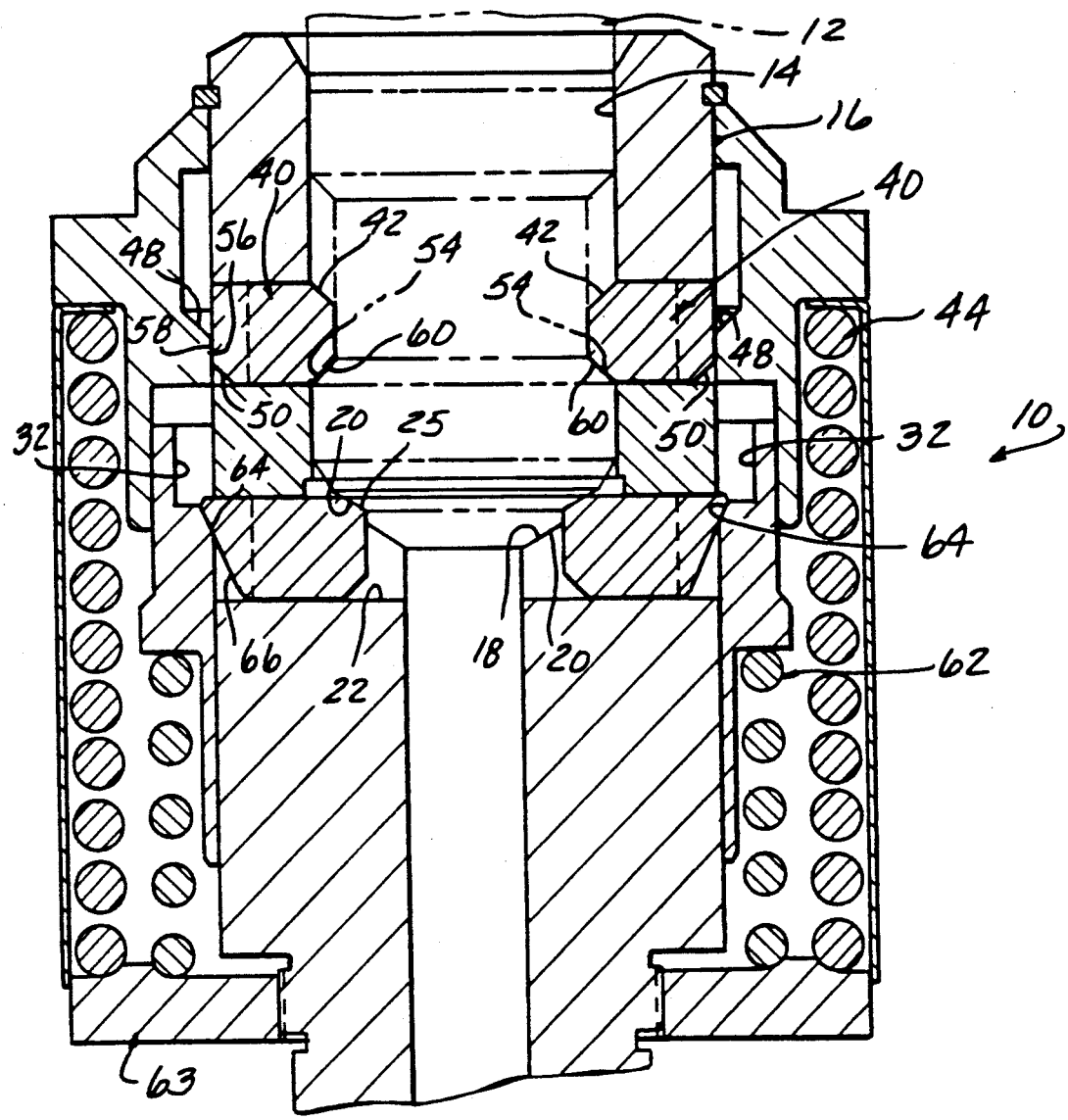
FIG. 4 is a fragmentary view of the puller assembly as shown in FIG. 1 but with both jaw sets in their fully closed and seated condition.
Figure 2:
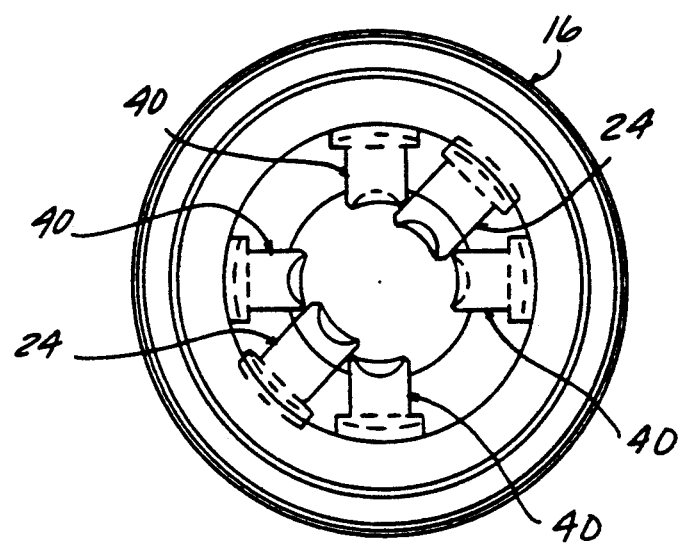
FIG. 2 is an end view showing the first and second jaw sets.

Referring to the Drawings and in particular FIG. 1, the puller assembly 10 is shown seated against a fixed reference surface A of the broaching machine which may be provided by the end of a stationary sleeve (not shown). A broaching tool 12 is shown with its lower end inserted into the bore 14 of a puller body 16. The end face 18 of the bore 14 tapers in conformity with the chamfered end face 20 of broach tool 12 which abuts thereagainst upon full insertion.

A pair of opposed radial slots 22 pass into the end face 18 and slidably receive respective elements 24 of a first jaw set 26. The radial inner ends of jaw elements 24 are arcuate in shape and each have chamfered surfaces 25 also in conformity with the chamfered end face 20 of the tool 20.

A first operating sleeve 28 is held in a down position by a second operating sleeve 30 of a second jaw set 31 which in turn is held by reference surface A, so that each recess 32 is in alignment with the tail 34 of a respective jaw element 24. The first jaw elements 24 are thus able to be forced radially out to a predetermined radially expanded position, the tool end face 20 resting on face 18 of bore 14 and the surfaces 25 of the first jaw set elements 24.

The second operating sleeve 30 also has a plurality of recesses 36, each aligned with the tail 38 of a respective second jaw element 40, each disposed in a radial slot 41 in the puller body 12. The second jaw elements 40 are thereby able to be cammed out by engagement of the upper surfaces 42 as the end face 20 of the tool 12 moves past during insertion.

As the puller assembly 10 is moved down, away from surface A, the second operating sleeve 30, being urged up by a second spring 44 held in cover sleeve 46, moves up relative to the puller body 16 as the puller body 16 descends. The cam surface 48 at the lower edge of the recess 36 engages the cam surface 50 on the lower edge of each second jaw element 40 to force the same into the annular groove 52 of the tool.

Figure 3:
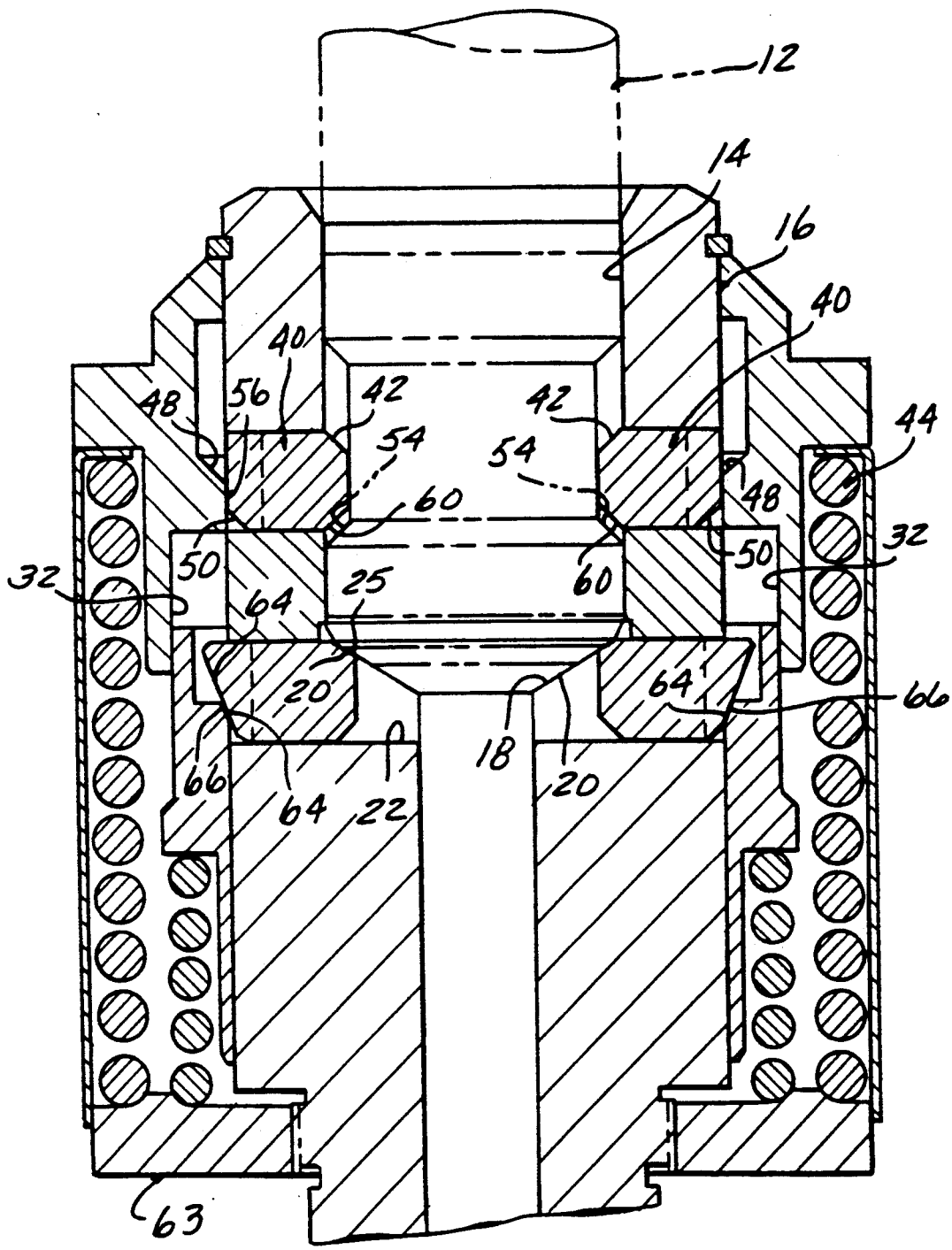
FIG. 3 is a fragmentary view of the puller assembly as shown in FIG. 1 in an intermediate condition.

As can be seen in FIG. 3, an axial clearance is provided with the lower side 54 of the groove 52 so that full in movement is assured with the radial wall 56 covering the arcuate ends 58 of the second jaw elements 40.

The tool 12 still rests on the bore end 18 preventing the first operating sleeve 28 from moving up.

Upon encountering the workpiece, a tool reaction force pulls the tool 12 up, with side surface 54 of groove 52 moving to be firmly abutted against the lower cam surface 40 of each of the second jaw elements 40. The second operating sleeve 30 moves axially with the inside diameter moves past the tail portions 38 of each second set jaw element 40, locking the same in their radially in position.

The upward tool movement creates an axial clearance between surfaces 25 and surface 20 and the tool end face 20 such that a first spring 62 compressed between a threaded adjustment disc 63 is able to move the first operating sleeve 28 up. A cam surface 64 on the first sleeve 28 adjacent the recess 32 engages cam surfaces 66 on the tail 34 of each first jaw element 24, forcing the jaw elements radially outward until surfaces 25 are each firmly in abutment with the surface 18 on the end face of the tool 12.

This takes up all axial clearance such that a positive locked connection between the tool 12 and puller assembly 10 is established.

Cam surfaces 64 and 66 are configured at a steeper angle than that of surfaces 20, 25 so that the first jaw elements are locked in their radially inmost position until the first operating sleeve 28 is again lowered to line up the recesses 32 with the tail portions.

Accordingly, a simple yet very reliable positive locking connection is enabled by this arrangement.

We claim:

1. A broach puller assembly for an elongated broach tool having an end section formed with an end face and an annular groove in said end section closely spaced from said end face, said end face having a chamfered surface, said annular groove defined by an annular side adjacent said end face inclined with respect to the length of said broach tool, said broach puller assembly comprising:

a puller body having a bore defined therein adapted to slidably receive said broach tool end section;

a first set of jaw elements; each jaw element in said first set slidably disposed in a radial opening entering said bore, each jaw element having a radially inmost engagement portion inclined to be adapted to engage said chamfered surface of said end face of said broach tool to be forced radially outward in which said jaw elements still underlie said end face of said broach tool to be determined radially expanded position;

each first set jaw elements having a radially outermost tail portion;

first jaw set operating means acting on said tail portion of each of said first set of jaw elements urging said first set of jaw elements radially inward and locking said first set jaw elements in a radially inmost position;

a second set of jaw elements having a radially inmost engagement portion and radially outer most tail portion, each second jaw set jaw element slidably disposed in a radial opening entering said bore in said puller body at a location whereat said engagement portion of each respective second jaw set jaw element enters into said annular groove of said broach tool with a clearance between a lower side of said respective second set jaw element and said annular side of said broach tool adjacent said end face when said end face is abutted against said first set jaw elements in said predetermined radially expanded position;

second jaw set operating means urging said second jaw set jaw elements radially inward, and locking said second set jaw elements in a radially inmost position;

means holding said first and second jaw set operating means to allow said first and second jaw set jaw elements to be moved to a radially expanded position upon insertion of said broach tool into said bore;

said second jaw set operating means including means initially forcing said second jaw set elements radially inward into said annular groove after insertion of said broach tool, and locking the same therein;

shifting of said broach tool to bring said one side of said annular groove subsequently allowing said first jaw set operating means to move said first jaw set jaw elements radially inward to abut against said chamfered end face of said shifted broach tool, whereby said second jaw set and said first jaw set are successively engaged with said broach tool.

2. The broach puller assembly according to claim 1 wherein said puller body bore is formed with a stepped diameter inclined at the same inclination as said broach tool chamfered surface, and engaged upon full insertion of said broach tool into said bore.

3. The broach puller assembly according claim 2 wherein said radial opening in which said first jaw set jaw elements are slidably disposed enters into said bore at said stepped diameter.

4. The broach puller assembly according to claim 1 wherein said first jaw set operating means includes a first operating sleeve slidably enclosed over said puller body and said tail portions of said first jaw set jaw elements, a recess in said first operating sleeve allowing said radial expansion of said tail portions of said first jaw set jaw elements in a predetermined axial position of said sleeve and a cam surface on said first sleeve adjacent said recess and a cam surface on each tool portion engaged by said first sleeve cam surface to cause radial inward urging of said first jaw set jaw elements upon movement out of said axial position in one direction, and spring means urging said first sleeve in said direction.

5. The broach puller assembly according to claim 4 wherein said cam surfaces are inclined at an angle steeper than said mating chamfered broach tool end face and tail portions of said first jaw set jaw elements whereby said cam surfaces when engaged with said jaw elements in engagement with said shifted broach tool lock said first jaw set jaw elements in a radially inner position against said chamfered end face of said broach tool.

6. The broach puller assembly according to claim 4 wherein said second jaw set operating means includes a second sleeve separate from said first sleeve slidably disposed over said puller body and said tail portions of said second jaw set jaw elements, a recess in said second sleeve allowing radial expansion of said second jaw set jaw elements with said second sleeve in a predetermined axial position of said second sleeve, and a cam surface on said second sleeve adjacent said recess engaging a cam surface on said tail portion of each of said second jaw set jaw elements acting to force said second jaw set jaw elements radially inward upon movement of said second sleeve from said predetermined axial position in one direction, and spring means urging said second sleeve in said one direction.

7. The broach puller assembly according to claim 6 wherein said first and second sleeves are in abutment with each of said first and second sleeves are in abutment with each of said first and second sleeves in their respective predetermined axial positions.

8. The broach puller assembly according to claim 7 wherein each of said second jaw set jaw elements engagement portion are formed with cam surfaces at the top and bottom adapted to engage with said chamfered end face or inclined one side of said annular groove respectively of said broach tool as said broach tool is inserted or removed respectively with said second jaw set jaw elements disposed radially inward.

9. A method of clamping a broach puller assembly to a broach tool having an end section configured with a chamfered end face and an annular groove having a side adjacent said end face, including the steps of:

locating said broach tool end section in said puller body bore in a fully inserted position therein at which a clearance is established causing one set of jaw elements carried by said puller body to move radially into said annular groove with clearance between each of said one set of jaw elements and said one side of said annular groove;

initiating a broach tool pulling process to cause said one side of said annular groove to shift axially and against said set of jaw elements;

moving another set of jaw elements carried by said puller body radially inward to engage said chamfered end face of said shifted broach tool while said one side of said annular groove is held against said one set of jaw elements;

locking said another set of jaw elements in position against said chamfered end face to thereby clamp said broach tool to said puller body without any axial end play.

10. The method according to claim 9 further including the steps of holding said another set of jaw elements in a radially expanded position during insertion of said broach tool, urging said another set of jaw elements radially inward after seating said chamfered end face against an abutment at said fully inserted position, but preventing radially inward movement while said broach tool is in said fully inserted position and thereafter releasing said another jaw set by shifting of said broach tool.

* * * * *